Sept. 9, 1958 R. H. DICKE 2,851,652

MOLECULAR AMPLIFICATION AND GENERATION SYSTEMS AND METHODS

Filed May 21, 1956 8 Sheets-Sheet 1

INVENTOR.
Robert H. Dicke
BY
J. C. [signature]
ATTORNEY

INVENTOR.
Robert H. Dicke
BY J. L. Whittaker
ATTORNEY

MOLECULAR AMPLIFICATION AND GENERATION SYSTEMS AND METHODS

Filed May 21, 1956 8 Sheets-Sheet 3

INVENTOR.
Robert H. Dicke
BY J. C. Whittaker
ATTORNEY

INVENTOR.
Robert H. Dicke
BY
J. L. Whittaker
ATTORNEY

INVENTOR.
Robert H. Dicke
BY J. L. Whittaker
ATTORNEY

Sept. 9, 1958 R. H. DICKE 2,851,652

MOLECULAR AMPLIFICATION AND GENERATION SYSTEMS AND METHODS

Filed May 21, 1956 8 Sheets-Sheet 6

INVENTOR.
Robert H. Dicke
BY
J. L. Whittaker
ATTORNEY

INVENTOR.
Robert H. Dicke
BY J. L. Whittaker
ATTORNEY

MOLECULAR AMPLIFICATION AND GENERATION SYSTEMS AND METHODS

Filed May 21, 1956 8 Sheets-Sheet 8

INVENTOR.
Robert H. Dicke
BY J. L. Whittaker
ATTORNEY 2,851,652
Patented Sept. 9, 1958

1

2,851,652

MOLECULAR AMPLIFICATION AND GENERATION SYSTEMS AND METHODS

Robert H. Dicke, Princeton, N. J.

Application May 21, 1956, Serial No. 586,201

55 Claims. (Cl. 322—2)

This invention relates to electromagnetic wave resonant gases, and particularly to improved methods and systems for wave generation and amplification employing such gases.

An electromagnetic wave resonant gas such as ammonia, when excited in a certain way and placed in a suitable environment, is capable of amplifying or generating electromagnetic waves. It is known, for example, that when there are more ammonia molecules in an upper of a pair of "inversion" energy states than in a lower of that pair of inversion states, the gas is capable of releasing energy in the form of microwaves having a characteristic "inversion frequency." The inversion microwave frequencies (there are more than one) of ammonia gas which have been observed extend roughly from about 16,000 to 40,000 megacycles. If an electromagnetic wave at a given inversion frequency is passed through the gas, when more of the molecules of the gas are in the upper than in the lower of the inversion states characteristic of that frequency, the gas gives up some of its energy to the electromagnetic wave, and the wave is amplified. Also, when the gas, in the same condition, is confined within a cavity resonator dimensioned to resonate at a given inversion frequency, the system can act as a generator of electromagnetic waves at that inversion frequency.

The conditions necessary for any electromagnetic wave resonant gas, hereinafter termed "resonant gas," to amplify or generate electromagnetic waves are first that there be more molecules in the upper than in the lower of a pair of "coupled" energy states, and second that there be a sufficient quantity of molecules in the upper of the coupled states to overcome the effects of resistive damping and/or other losses in the system. The greater the quantity of molecules in the upper of the coupled states, the greater the output power available from the amplifying or generating apparatus.

It is an object of this invention to provide new and improved apparatus for increasing the quantity of molecules of a resonant gas in the upper of two coupled energy states.

A more general object of this invention is to provide new and improved apparatus for concentrating the molecules of any gas.

Another general object of this invention is to provide an apparatus capable of obtaining a useful output from a resonant gas at a frequency characteristic of the transition of gas molecules between a pair of rotational internal energy states.

Another general object of this invention is to provide improved methods of and apparatus for coherently generating and/or amplifying microwaves or infra-red waves.

Still another object of this invention is to provide improved apparatus for amplifying energy at frequencies in either the microwave or infra-red region of the spectrum which are characteristic of molecular transitions in a resonant gas such as ammonia.

Yet another object of this invention is to provide improved means for producing, with the aid of resonant gas, relatively high power electromagnetic wave pulses in either the infra-red or microwave regions of the spectrum.

2

One aspect of this invention relates to improved methods and apparatus for the concentration of the molecules of a gas. A typical embodiment employs a member formed with an endless annular aperture through which a gas is adapted to flow. The aperture is divided into canals or channels having axial dimensions which are relatively long compared to their cross-sectional dimensions. The axes of the channels extend toward a common center region, preferably in the same plane as the aperture. The molecules of the gas with a velocity component principally in the direction of the center region are selectively passed through the channels. Means are provided for focusing these molecules into a continuous stream or sheet directed from the endless aperture into the center region.

If an electric field is made to act on a resonant gas, the internal energies of the gas molecules are affected. The effect is known as the "Stark" effect. In the case of ammonia, the field causes the internal energy of molecules in the upper of each pair of inversion energy levels to increase and the internal energy of molecules in the lower of each pair of inversion energy levels to decrease. The molecules with increased internal energy are deflected away from the field and those with decresed internal energy are deflected toward the field. These phenomena are made use of in this invention for increasing the quantity of molecules of a resonant gas in the upper of two coupled energy states, as is explained more fully below.

The gas to be focused is one which is subject to an ammonia type of Stark effect, as discussed above. The means for focusing the gas may include a plurality of ring-shaped, spaced, concentric wires lying in planes on each side of the endless aperture and extending from the aperture toward the common center region. Alternate wires are charged to the same potential and adjacent wires are maintained at a high difference in potential. The gas passes through the aperture between the planes of the concentric wires. Gas molecules in the lower of a pair of coupled energy states are attracted toward the wires and thereby effectively defocused, whereas those in the upper of the pair of coupled energy states are collimated and passed through the center region.

In a specific form of the invention, designed for the amplification or generation of microwaves, the center region is within a cavity resonator or other hollow electromagnetic wave transmission means. The gas employed is a dipole moment gas, preferably ammonia. The wave transmission means is dimensioned to propagate electromagnetic waves at one of the frequencies characteristic of the transition of ammonia molecules from an upper to a lower inversion energy state.

The apparatus of this invention is also suitable for the coherent generation or amplification of infra-red waves. In this form of the invention, the rotational transition of ammonia gas molecules from the upper inversion level of one rotational energy level to the lower inversion level of a second rotational energy level is employed. The center region through which the gas is focused is within a wave transmission means such as a resonator dimensioned to resonate at the infra-red frequency which is characteristic of the transition above-described. Details of the wave transmission means structure are given below.

An even greater accumulation of gas molecules may be obtained by employing a plurality of gas concentrating devices arranged in additive relation. A plurality of annular apertures, each with relatively long narrow channels therein, and each with its own gas focusing means, are concentrically arranged about an elongated, transversely slotted electromagnetic wave transmission means. The focused streams of high energy state gas from successive annular apertures pass through succesive transverse slots, respectively. The wave tranmission means is dimensioned to propagate a frequency which is characteristic of a molecular transition.

The apparatus described in the immediately preceding paragraph is suitable for continuous wave power amplification or for generating extremely high power pulses in either the microwave or inra-red region of the spectrum. In the pulsed operation the generator may be made quiescent (by temporarily detuning the gas in the wave transmission means, for example, or by other means) for a time sufficiently long to concentrate within the wave transmission means gas molecules which are predominately in an upper inversion energy state. The energy stored in the gas is then released in the form of a short pulse. The result is the generation of an "electromagnetic shock wave" at a frequency characteristic of a molecular transition. More details of this interesting phenomenon are given below.

The invention will be described in greater detail by reference to the following description taken in connection with the accompanying drawing in which.

Figure 2:
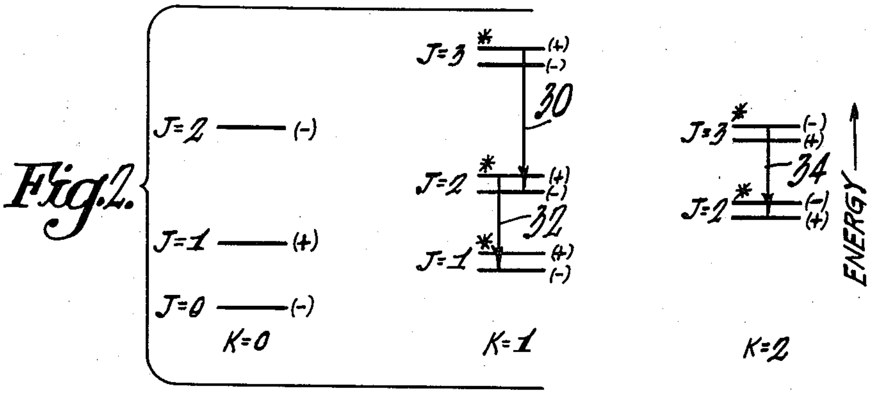
Figure 2 is a sketch of the distribution of energy states for ammonia gas.
Figure 2A:
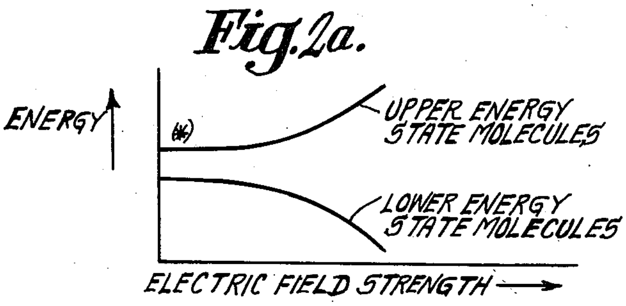
Figure 17A:
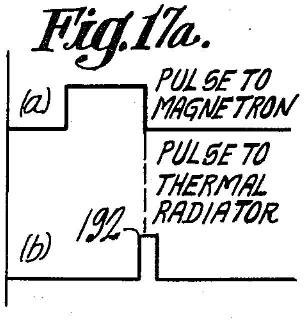
Figure 6A:
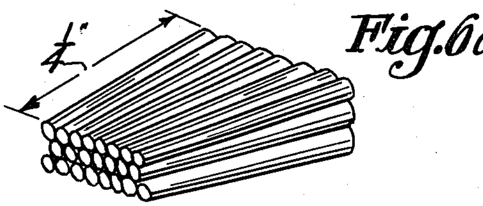
Figure 3:
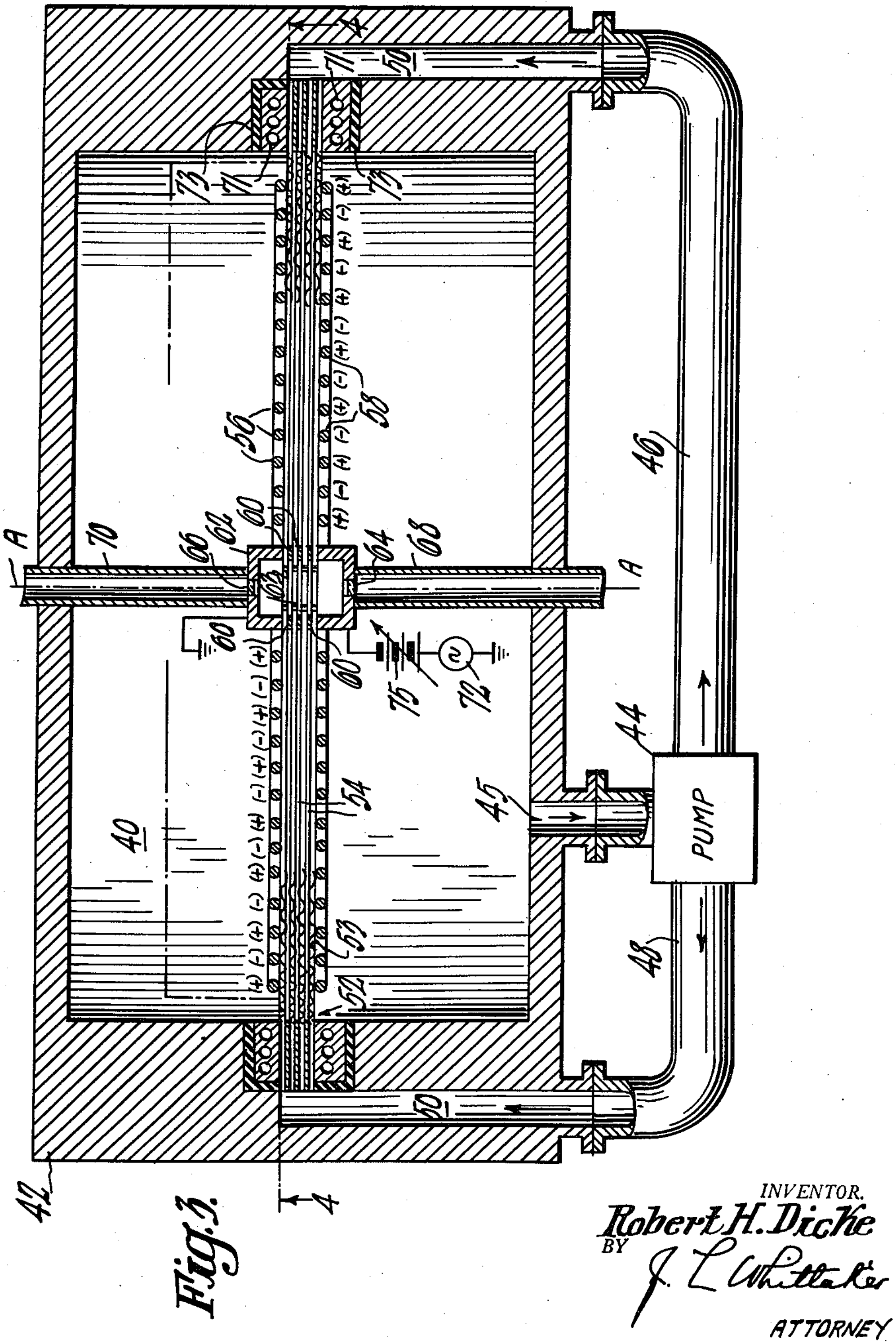
Figure 4:
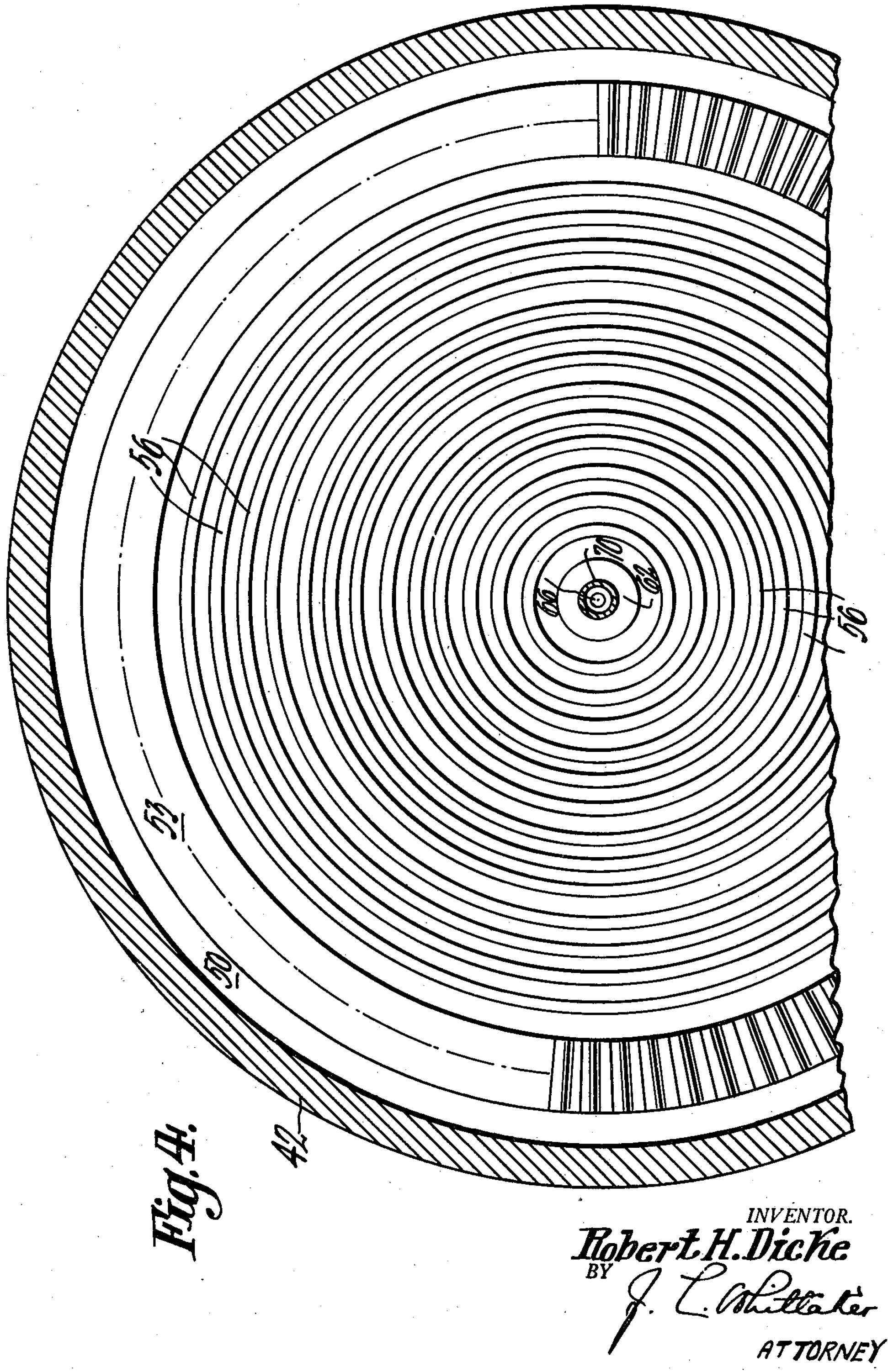
Figure 5:
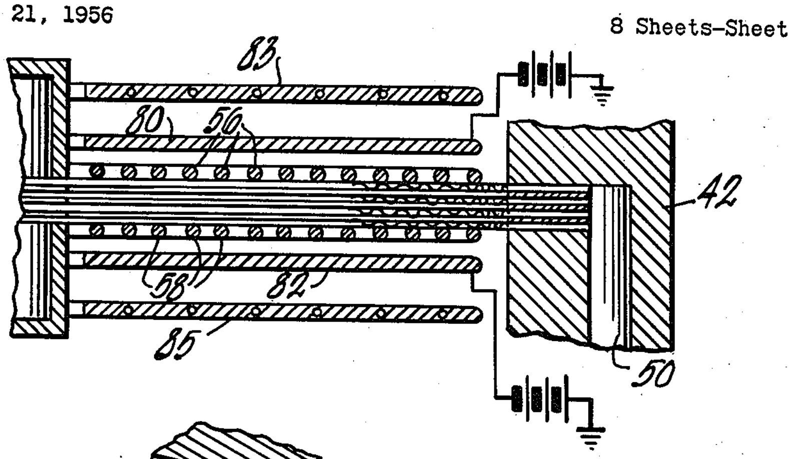
Figure 6:
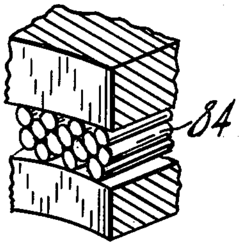
Figure 9:
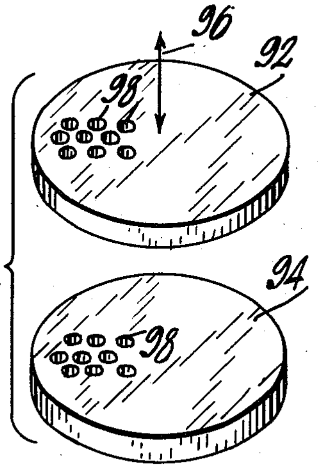
Figure 7:
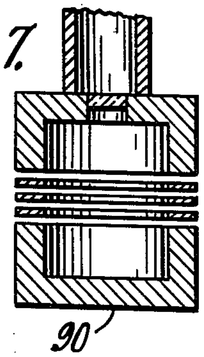
Figure 8:
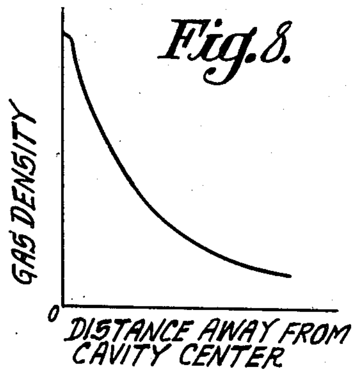
Figure 10:
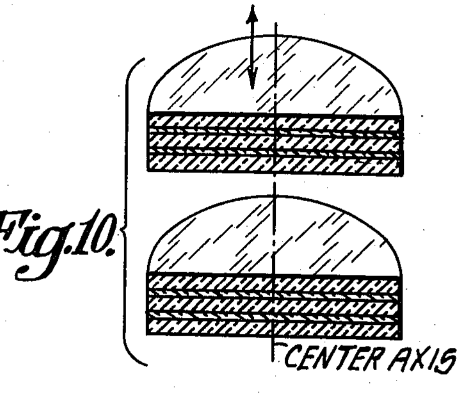
Figure 11:
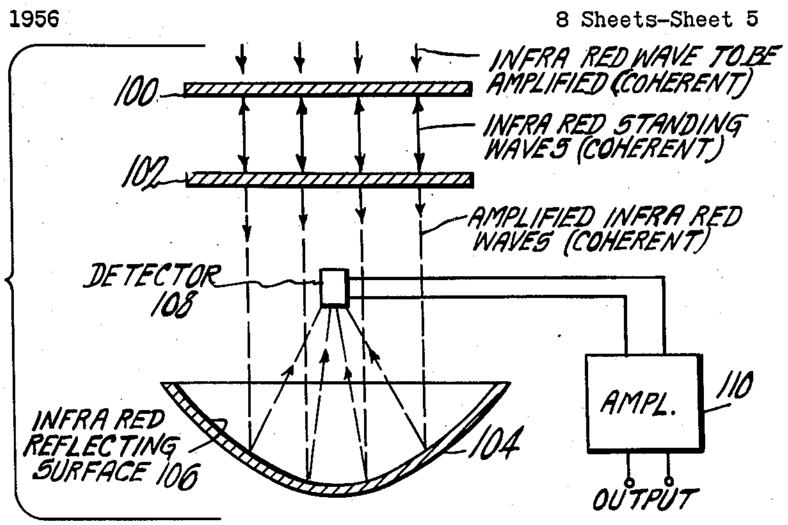
Figure 12:
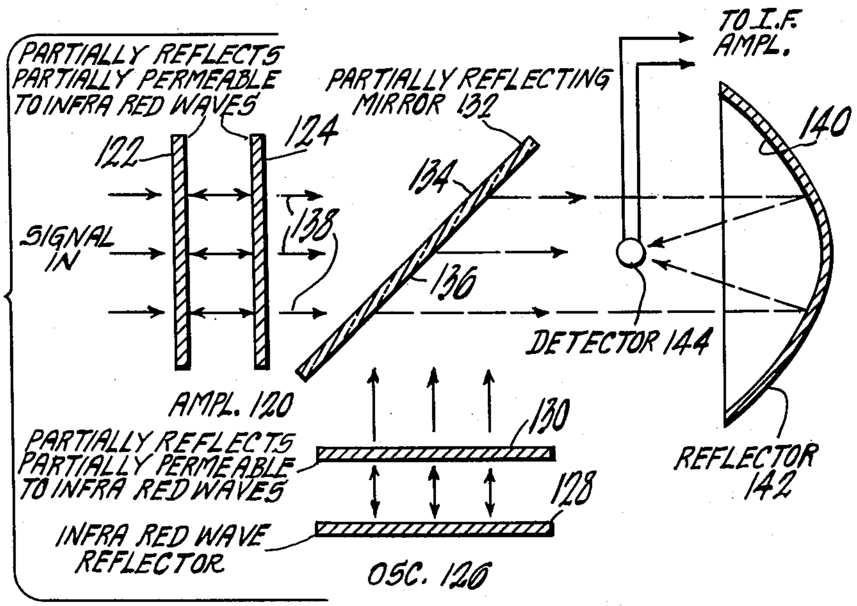
Figure 21:
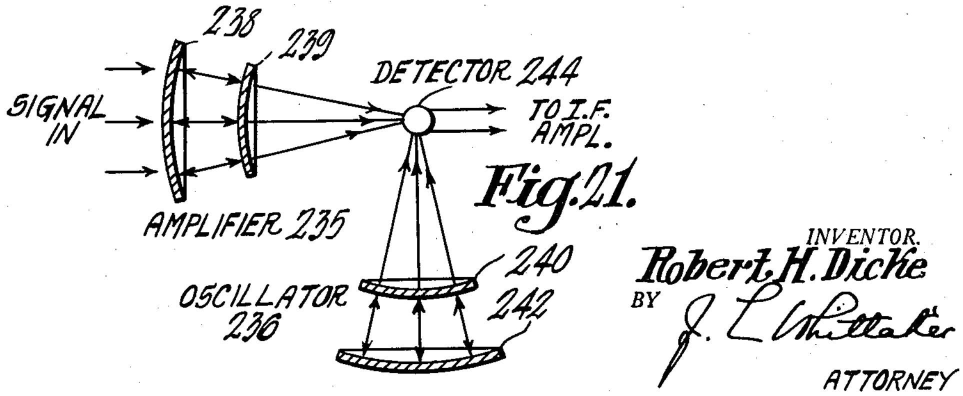
Figures 13, 15, 17:
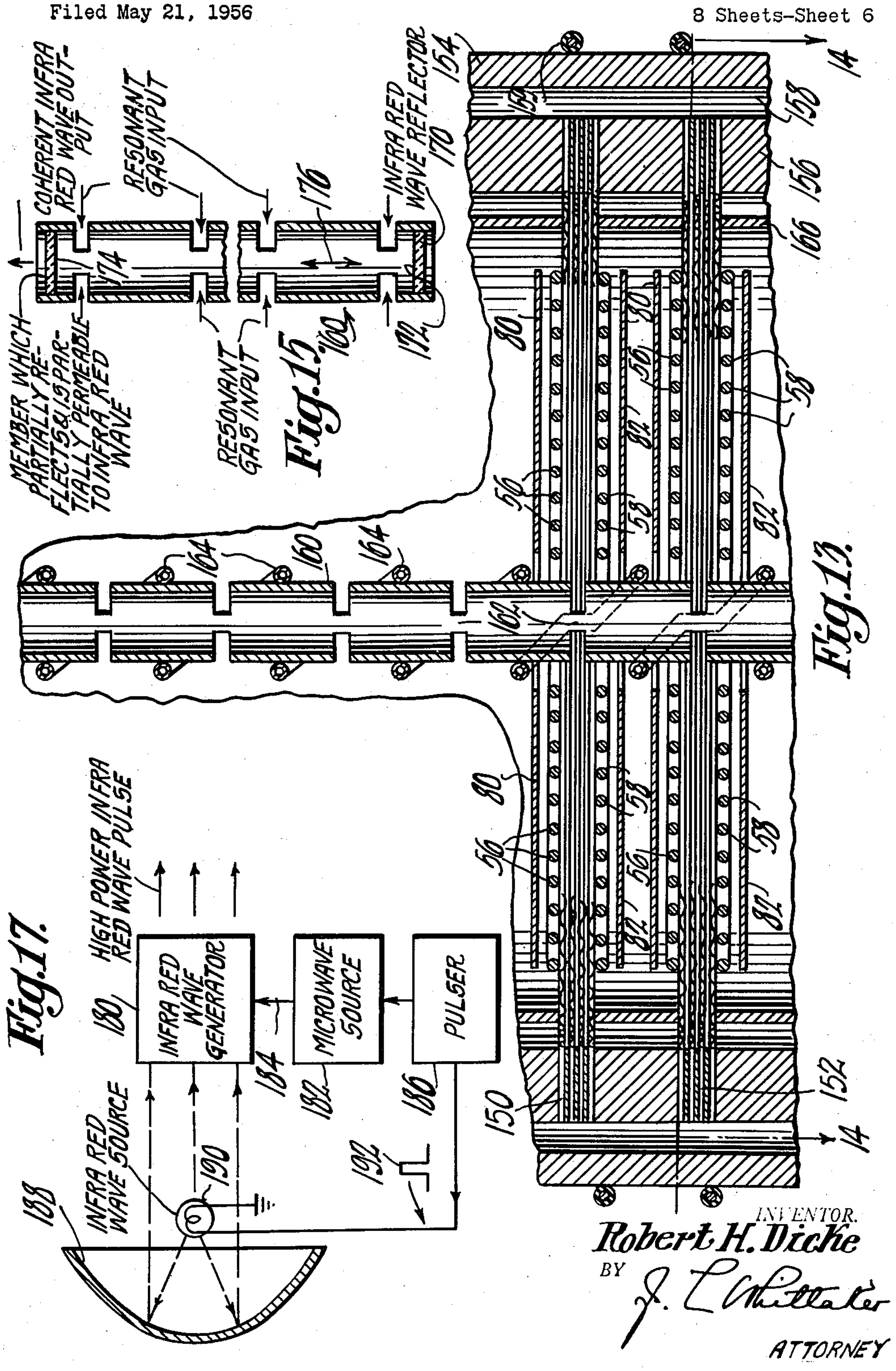
Figure 14:
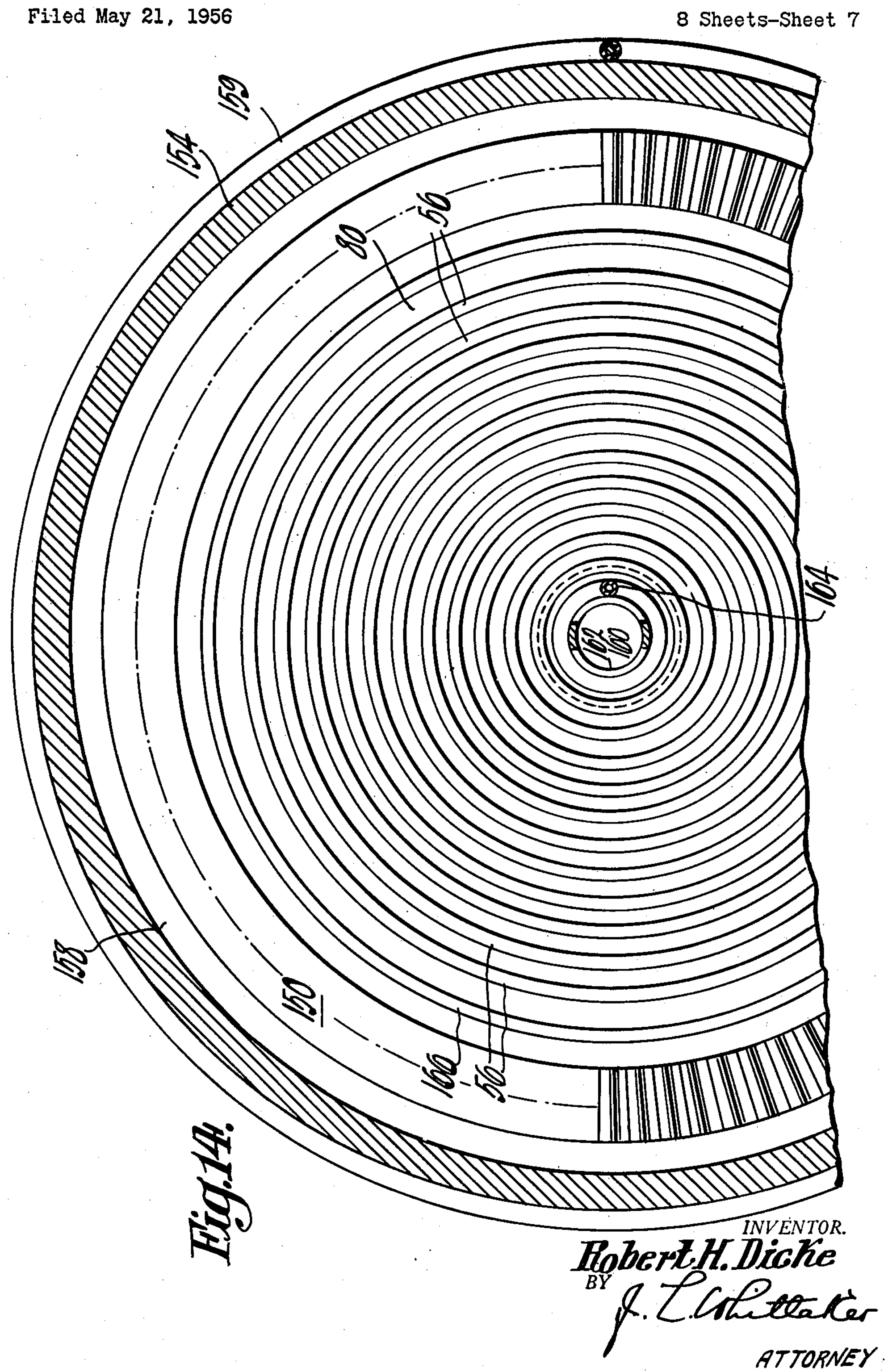
Figure 5A:
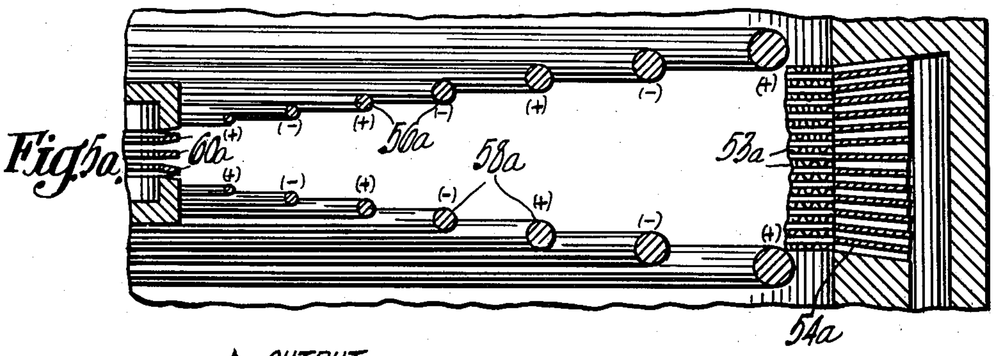
Figure 16:
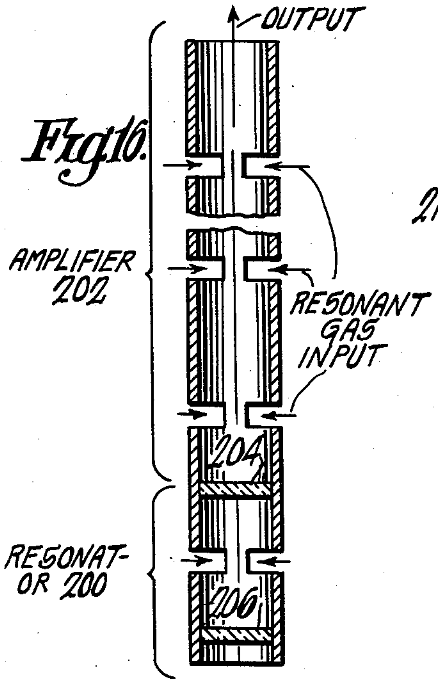
Figure 18:
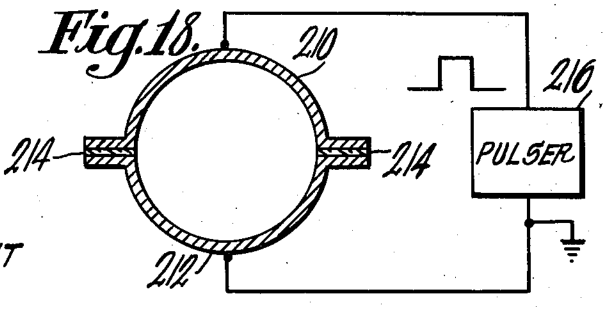
Figure 19:
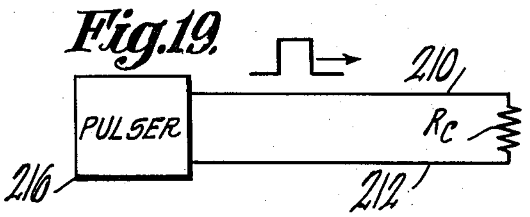
Figure 20:
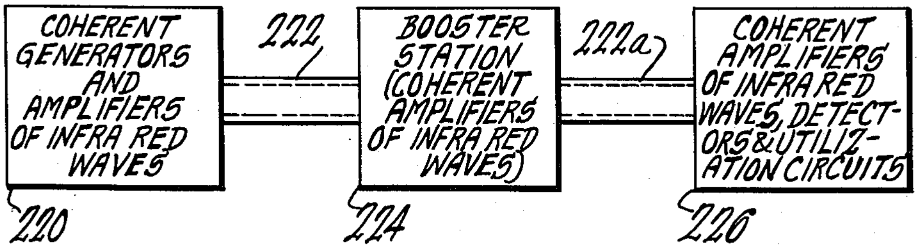

Figure 2*a* is a sketch to illustrate the effect of an electric field applied to the molecules of a resonant gas in coupled, inversion energy levels;

Figure 3 is a cross-sectional view of an amplifier or oscillator according to this invention;

Figure 4 is a cross-section along line 4—4 of Figure 3;

Figures 5 and 5*a* are cross-sectional views of portions of modified amplifiers similar to the one shown in Figure 3;

Figure 6 is a perspective view of a portion of the system shown in Figure 3, in modified form;

Figure 6*a* is a sketch to illustrate a step in the manufacture of the tubes shown in Figure 6;

Figure 7 is a cross-sectional view of the cavity resonator portion, in modified form, of the system shown in Figure 3;

Figure 8 is a sketch of the approximate gas density as a function of the distance from the center of the system shown in Figures 3–6;

Figures 9 and 10 are perspective views of infra-red modifications of the system shown in Figures 3 and 4;

Figures 11 and 12 are schematic representations of equipment embodying the resonators shown in Figures 9 and/or 10;

Figure 13 is a partially cut-away, cross-sectional view of a portion of a high power amplifier or generator employing resonant gas;

Figure 14 is a cross-section along line 14—14 of Figure 13;

Figures 15 and 16 are cross-sectional views of wave transmission means which may be used in the system of Figures 13 and 14 when the latter acts as a generator of infra-red waves;

Figure 17 is a block circuit diagram of a pulsed, coherent infra-red wave transmitting system according to the invention;

Figure 17*a* shows waveforms generated in the circuit of Figure 17;

Figures 18 and 19 are sketches of a modified wave transmission means for the form of the invention shown in Figure 17;

Figure 20 is a block circuit diagram of an infra-red wave communications system according to this invention; and Figure 21 is a sketch of a modified form of the apparatus shown in Figure 12.

Throughout the figures similar reference characters are applied to similar elements.

Figure 1:
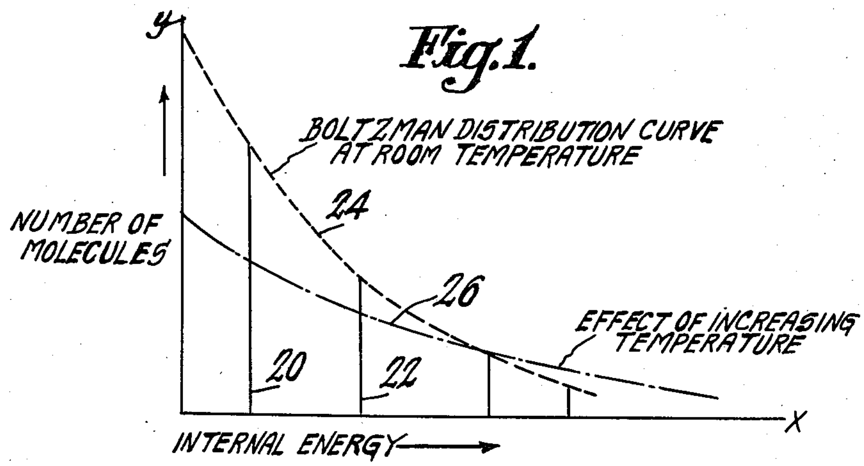
Figure 1 is a sketch of the distribution of molecules of a resonant gas among different molecular energy levels.

Before discussing the apparatus of this invention, the theory of molecular resonance will be described in brief. Figure 1 shows, in schematic form, the distribution of molecules of a resonant gas among different molecular energy levels. The molecules of the gas are in discrete energy levels. Under conditions of thermal equilibrium, as the energy of the levels successively increase, the numbers of molecules in the levels successively decrease (disregarding the so-called "degenerate" levels). For example, one can see that at ordinary room temperature there are more molecules in energy level 20 than energy level 22, etc. A curve may be drawn through the tops of lines 20, 22, etc. and this is shown as dashed line 24. This curve is known as the Boltzmann distribution curve. When the temperature of the gas is raised, the Boltzmann distribution curve is shifted as shown by dot-dash line 26. At the higher temperatures there are less molecules in the lower energy states than there were at room temperature and there are more molecules in the upper energy states than there were at room temperature. If the temperature of the gas could be increased to infinity, the Boltzmann distribution curve would degenerate to a straight line parallel to the $x$ axis. In all cases, the area under the curve remains the same.

The numbers of molecules in the different energy levels, at thermal equilibrium, may be defined by the following equation:

$$\frac{P_2}{P_1}=e^{\frac{-\Delta E_0}{kT}} \qquad (1)$$

where:

$P_1$=number of molecules in the lower of two coupled energy levels $P_2$=number of molecules in the upper of two coupled energy levels $\Delta E_0=h\nu$ $h$=Planck's constant $\nu$=the frequency of the microwave transition $T$=temperature of the gas in degrees Kelvin $k$=a constant $e$=the base of natural or Napierian logarithms and is equal to approximately 2.718

Note that as T increases $P_2/P_1$ approaches 1.

The above equation can also be used to define the temperature of the gas when it is not in thermal equilibrium. When $P_2$ is greater than $P_1$, the gas is said to have a negative internal temperature (see equation). This does not mean that the normal gas temperature is negative. It is only the internal temperature associated with the two coupled energy states which is negative.

In certain gases, such as ammonia, for example, certain of the energy states are known as degenerate states. The molecules in these states may be thought of as being in one of two distinct but equal energy states. A partial energy level diagram for ammonia or ammonia-like substances is shown in Figure 2.

Referring to Figure 2, the numbers which the letters J and K represent are known as quantum numbers. The quantity J may be thought of as a measure of the total rotational angular momentum of an ammonia molecule and the quantity K as the component of this momentum along the axis of symmetry of the ammonia molecule. A transition from one energy level to another can be accompanied by the radiation or absorption of electromagnetic energy by the molecule. Such transitions can occur only between certain energy levels known as "coupled" energy levels.

The transitions for which the quantum numbers J and K do not change are the familiar inversion transitions leading to the emission or absorption of radiation in the microwave frequency band. For example, when a gas molecule in the $K=1$, $J=3$, $(+)$ state changes to one in the $K=1$, $J=3$, $(-)$ state, the gas emits energy at a frequency of 22,234.51 megacycles.

It has been found that when a molecule in an upper inversion state changes to one in a coupled, lower inversion state having a different J number, the gas emits energy in the infra-red frequency band. This transition is known as a "rotational" transition. According to certain "selection rules" known to those skilled in this art, rotational transitions can occur only when $\Delta K=0$, and $\Delta J=1$.

The asterisks in Figure 2 denote the molecules whose populations may be increased with the apparatus to be described in more detail later. (The number of molecules with orientation quantum number $M=0$, are neither increased nor decreased, as understood by those skilled in this art). When there is a transition as indicated by arrows 30, 32 or 34, the gas emits infra-red rays. For example, a typical transition is:

$$\left.\begin{array}{l} J=3 \\ K=1 \\ (+) \end{array}\right\} \rightarrow \left\{\begin{array}{l} J=2 \\ K=1 \\ (-) \end{array}\right.$$

In ammonia, a transition from an energy level with a quantum number $J=x$ to one with a quantum number $J=x-1$ is accompanied by the emission of radiation with a frequency approximately given by the following equation:

$$\gamma=2Bx \quad (2)$$

where $B=2.98\times10^5$ megacycles.

For $J=2$, the lowest value of J for which the above type of transition takes place, the corresponding wavelength is about one-quarter of a millimeter, or 250 microns. This is in the far infra-red region (the one close to the microwave region of the spectrum). As the J number goes up, the infra-red wavelength becomes shorter, that is, it moves toward the visible light region of the spectrum.

It has already been mentioned that if the ammonia gas is heated, the molecular populations can be increased in the upper energy (J) levels. It has also been mentioned that as the value of J increases, the infra-red frequency characteristic of a transition involving that J number increases. When the ammonia is heated in order to increase the molecular populations of high J numbers, there are still relatively small molecular populations in these levels. Note in Figure 1 that even with increased temperature, the molecular populations in the high J number levels are still relatively low compared, for example, to the molecular population in a low energy level at room temperature. This is disadvantageous as the fewer the molecules available for a molecular transition, the lower the power output.

Nevertheless, there is a compensating factor. At the higher frequencies (those characteristic of transitions from relatively high eneregy states) the absorption coefficient, which is a measure of the strength of the coupling between the molecules of the gas and electromagnetic wave to which the gas gives up its energy, is much greater than at the lower frequencies. An increase in absorption coefficient means an effective increase in "gain." In other words, the decrease in numbers of molecules, which normally means lower power output, is compensated for by an increase in the "gain" of the gas.

It should be appreciated, at the same time, that at the longer wavelength infra-red radiation, the gas is much more effective for generating or amplifying radiation than it is in the microwave region. The frequency, for example, for $J=2$ in Equation 2 is a factor of 40 higher than a frequency in the K band region. This results in a factor of 10 or more increase in the absorption coefficient of the gas.

Figures 3 and 4 illustrate an amplifying or generating apparatus according to this invention. The space 40 within the gas-tight, metal envelope 42 is highly evacuated by means of a pump (not shown) which communicates with chamber 40. After the evacuating process, a small amount of resonant gas such as ammonia is admitted into chamber 40 via a supply nozzle (not shown). As will be explained later, a portion of the gas may eventually become unusable and in such case, gas may be continuously supplied to take the place of the unusable gas.

The gas is continuously circulated by a diffusion pump 44 which pumps the gas, at reduced pressure, from chamber 40 through conduits 46 and 48 and into an annular space 50 in the wall of container 42. Pipes 46 and 48 may feed space 50 at a plurality of spaced points around the circumference of the space. On the other hand, even if fed at a single point, the gas will rapidly diffuse through space 50. The gas passes through space 50 and out of aperture 52 which is continuous, or substantially continuous, and which extends around the entire inner circumferential wall of chamber 40.

Positioned in the annular aperture 52 are a plurality of continuous, corrugated sheets 53 separated by thin spacer plates 54. The corrugations and spacer plates provide a large number of small canals, all directed toward the axis A—A of the system. The axial length of the canals is much longer than the cross-section of each canal. The spacer plates may be 1 mil or so in thickness (they are not shown to scale in the drawing). The corrugated sheets may be formed of metal foil having a thickness of 1 mil. The corrugations may be 2 mils in height. The length of each canal may be on the order of from ⅛ inch to ¼ inch. The corrugations extend around the entire circumference of the aperture but are only partially shown in Fig. 3 and in some other later figures.

The purpose of the long and narrow canals in the annular aperture is to selectively pass only those molecules moving toward the axis A—A. When emerging from the canals, the gas can be thought of as being in a continuous annular sheet, however, the individual molecules of the gas have small or negligible components of motion in the directions other than that toward axis A—A.

After being emitted from the canals, the gas passes through a path between upper concentric rings 56 and lower concentric rings 58. As can be seen in the figure, alternate ones of the rings are maintained at same potentials and adjacent rings are maintained at a relatively high difference in potential. For example, one set of alternate rings may be maintained at +25,000 volts and the other set of alternate rings at −25,000 volts, or, one set may be maintained at ground potential and the other at plus or minus 50,000 volts. Higher voltages are possible and desirable. The means for charging the rings are not shown nor are the means for supporting the rings relative to the container. The former may comprise any well known type of high voltage generator and the latter may comprise dielectric supports.

Figure 3 and the other figures are not drawn to exact scale, however, typical dimensions may be as follows. (These dimensions are to be taken as illustrative rather than limiting as other dimensions are possible.) The diameters of rings 56, 58 may be about ½ cm. and the spacing, in radial direction between rings, may be about 1 cm. on centers. The annular path between rings 56 and 58 may be about 2 cm. in width and about 10 inches in radial length.

As the gas streams from the canals in aperture 52 toward the center axis A—A of the structure of Figures 3 and 4, it moves through the electric fields produced by the rings. The field intensity is very high close to the rings and relatively low in the median plane between rings. The gas molecules in the upper inversion levels (those marked with an asterisk in Figures 2 and 2*a*) increase their internal energy and are focused toward the median plane between the rings. The gas molecules in the lower inversion levels decrease their internal energy and are deviated away from the median plane. The path length between the upper and lower focusing rings is sufficiently long so that the molecules in the lower inversion levels are effectively eliminated from the molecular beam and those in the upper levels collimated into streams or sheets which pass through apertures 60 in the wall of cavity resonator 62.

The ammonia gas in the chamber is at reduced pressure. For example, the gas emitted from the aperture may have a pressure of $10^{-6}$ or $10^{-5}$ millimeters of mercury and the concentrated gas within the cavity resonator a pressure of $10^{-5}$ or $10^{-4}$ millimeters of mercury, respectively.

Cavity resonator 62 is preferably so dimensioned that it is resonant at one of the frequencies characteristic of the transition between the upper and lower of a pair of inversion energy levels. The cavity resonator is designed for operation in the $TE_{01}$ mode so that the annular apertures in its circumferential wall have substantially no effect on its operation. Three equiangularly spaced dielectric supports 63, two of which are shown in Figure 3, may be used to hold the rings in the annular aperture in place. The resonator is formed with coupling apertures 64, 66 at opposite ends thereof, each including an electromagnetic, wave-transparent window formed of mica or the like. An input waveguide 68 is coupled to the cavity resonator through aperture 64 and an output waveguide 70 is coupled to the cavity resonator through aperture 66. When waves at a frequency characteristic of the transition of gas molecules from the upper to the lower inversion state to which the resonator is tuned are passed through the resonator, they are amplified.

The gas molecules in the lower inversion states and the gas molecules which pass through the cavity resonator are pumped out of the container through channel 45. Although not shown, it may be desirable, in some forms of the invention, to refrigerate the walls of chamber 40 in order to condense (that is, freeze) the unusable ammonia gas. This may take the form of coils of refrigerant in the walls of the container 42; however, these are not shown. If desired, annular plates may be positioned between the plane in which rings 58 are located and the lower walls of the container and between the plane of rings 56 and the upper walls of the container to remove excess ammonia. These plates may be refrigerated by passing a refrigerant through coils in or connected to the plates.

In another form of the invention, the unusable gas may be evacuated by a mercury diffusion pump integral with the container structure. In this form of the invention, collimated streams of mercury vapor are passed from one wall of the container through the inner part of the container and out through the other wall of the container. The streams of mercury vapor pass relatively close to the planes of the grid wires. One or more streams pass above wires 56 (as viewed in Figure 3), and one or more streams pass below wires 58 (as viewed in Figure 3). The lower energy state gas molecules (which are defocused by the high fields of the grid wires) are captured by the mercury vapor streams and swept out of the container.

It has been previously mentioned that it may be desirable to heat or cool the resonant gas to change the molecular populations of the different energy levels at thermal equilibrium. One means for doing this is illustrated in Figure 3. It consists of a plurality of pipes 71 surrounding aperture 52 and insulated from the walls of container 42 by insulation 73. If it is desired to cool the gas passing through the aperture, a refrigerant is passed through the pipes. If it is desired to heat the gas passing through the aperture, a hot liquid, or a hot gas such as steam, is passed through the pipes. Other heating means are possible. For example, electrical heating coils embedded in the aperture walls may be employed.

With the form of the invention shown schematically in Figure *5a*, even greater concentrations of gas may be obtained than with the one of Figures 3 and 4. This is accomplished by making the annular aperture **52*a*** several times greater in width than the one of Figure 3. The gas collimating system is similar to the one of Figure 3, however, the concentric, charged, conductive rings, rather than being in parallel planes, lie in planes which converge toward the center region of the cavity resonator. The rings are charged similarly to the ones of Figure 3. The rings successively increase in diameter and spacing in the direction away from the cavity resonator in order to improve the focusing action.

Within aperture **52*a* are annular corrugated plates 53*a* and thin spacer plates 54*a*. The corrugations and spacer plates are arranged to form long narrow canals, all generally directed to the center region of the cavity resonator 62*a*. The latter may be similar to the one of Figure 3, however, the plates in aperture 60*a*** should slightly converge toward the center of the cavity resonator.

The form of the invention shown in Figure **5*a*** is applicable to the embodiments illustrated in the other figures including the ones designed for microwave amplification or generation or infra-red wave amplification or generation.

The output frequency of the system may be varied by making use of the Zeeman (magnetic) effect or the Stark electric effect. A means for tuning using the latter effect is schematically illustrated in Figure 3. Tuning is accomplished by adjusting the direct potential applied across the cavity resonator and thereby adjusting the electrostatic field through the cavity resonator. The tuning means is shown schematically as a battery 75 with an arrow through it. The output frequency may be frequency modulated by similar means—shown in the drawing as an alternating current generator 77 in series with battery 75.

An important advantage of the system described above over other known gas focusing systems is that the gas density at the annular aperture is relatively low compared to the gas density within the cavity resonator. This means relatively long mean-free paths between gas molecules at the aperture and a correspondingly smaller possibility of molecular collisions. Molecular collisions are highly disadvantageous as they result in the return of many high energy state molecules to the low energy state.

An alternative focusing arrangement is shown in part in Figure 5. Here, the upper rings 56 and lower ones 58 are all maintained at the same potential, shown as ground potential in the figure. Annular plates 80 and 82, which are spaced from the cavity resonator, are maintained at high negative potentials such as —25,000 or more volts. Alternatively, the plates may be maintained at high positive potentials. The mode of operation of this arrangement is similar to that of the one shown in Figures 3 and 4. The upper energy state molecules are focused, whereas the lower energy state molecules are eliminated from the molecular beam. Preferably, plates 80 and 82 are formed with holes (not shown) to permit the low energy state gas to pass through the holes. Other, refrigerated plates 83, 85 may be provided as condensing surfaces for the defocused low energy state gas molecules.

In Figures 3, 4, 5 and *5a*, corrugated sheets are shown in the annular aperture for forming long, narrow canals through which the gas may pass. An alternative arrangement is shown in Figure 6. Positioned in the annular aperture are a plurality of individual hollow tubes 84, all directed toward the system axis A—A. Tubes of this type may be made as follows. A length of silver wire about 5 mils in diameter is copper plated to a thickness of about 0.1 mil. The plated wire is then cut into short lengths of about ¼ inch and compressed into a generally truncated pie-shaped bundle as shown in Figure 6*a*. The bundle is then dipped in an acid bath to dissolve out the silver. The resultant structure comprises a plurality of hollow copper tubes such as shown in Figure 6. A plurality of such bundles are positioned side-by-side in the annular aperture with the axes of the tubes all directed toward the center axis A—A of the system.

The systems of Figures 3, 4 and 5 are useful both as amplifiers and generators. The cavity resonator of Figure 7 differs from the one shown in Figures 3 and 4 in that the bottom wall 90 is continuous to enhance the regenerative feedback within the cavity resonator. When the system of this invention uses such a cavity resonator, it is mainly useful as an oscillator or generator.

Figure 8 is a sketch of the gas density within the cavity resonator as a function of the distance from the center of the cavity resonator. The gas emitted from the circular aperture is all focused at the center region of the cavity resonator so that the gas density in this region is extremely high.

In the embodiments in this invention which have been described so far, the generated frequency is in the microwave region. An embodiment will now be described which is capable of coherently generating infra-red waves. As used herein, the term "coherent" means the cooperative radiation of electromagnetic waves by the molecules of a gas. The radiation from the different molecules, in other words, is phase related. This type of operation may be contrasted with the black body and other types of infra-red ray emitters as we know them today in which the infra-red waves are incoherent. Coherent infra-red waves, like other coherent electromagnetic waves, may be used to transmit intelligence via amplitude, phase, or frequency modulation. Such waves, which have never before been produced, are extremely useful and add a new dimension to communications.

It has been previously mentioned that ammonia gas is capable of generating or amplifying infra-red waves at characteristic rotational transition frequencies. These occur when the molecules of a gas in one upper inversion state return to another, lower inversion state having one less unit of angular rotational momentum. In order to extract a useful output from the excited gas, the microwave cavity resonator is replaced with an infra-red wave resonator. The latter consists of two parallel plates 92, 94, as shown in Figure 9, spaced apart an integral number of half wavelengths at an infra-red frequency characteristic of a molecular transition in the gas. The spacing between the plates is adjustable as indicated by arrow 96 in Figure 9. In practice, the plates may initially be aligned by optical techniques. The vernier, final adjustment may be made by thermally tuned struts (not shown). Other adjusting means are possible. When used as an amplifier, plates 92 and 94 are formed with a large number of very small holes or perforations through the entire extent of the plates. For the sake of drawing simplicity, only one portion of plates 92 and 94 are shown formed with holes, however, it will be appreciated that the entire plate may be so constructed. The holes may be distributed in a regular square, hexagonal or other geometric array over the surface of the plate. They are spaced less than a wavelength apart. The holes serve to transmit wavelets of infra-red radiation which reinforce each other and produce a plane wave traveling through the surface. A portion of the energy between the plates is reflected from the inner surfaces of the plates and a standing wave pattern is set up.

When used as an amplifier, preferably both plates are perforated, with the holes in the output plate somewhat larger than those in the input plate in order to obtain preferential radiation through the output plate. When employed as a generator of coherent infra-red waves, one or both of the plates may be perforated.

The hole dimensions and spacings depend upon the infra-red frequency to which the resonator is tuned. For a resonator designed to operate at the microwave transition wavelength of 250 microns, the holes may be placed in a square array, spaced apart 0.007 inch. Each hole may be 0.001 to 0.002 inch in diameter. Holes of this size are entirely practical and may be made in metal using photo-etching techniques. The metal may consist of a very thin (0.0005 inch or so) film of metal such as silver, copper or gold plated onto an infra-red wave transparent backing plate made of quartz, Teflon or similar low loss substance. The layer should be greater than a skin depth in thickness. For shorter infra-red wavelengths correspondingly smaller holes and spacings (the sizes varying roughly as the wavelengths involved) are employed. The diameter of the plates may be from 1 to 3 inches.

At the near end of the infra-red spectrum, the cavity resonator is constructed as shown in Figure 10. Here, the plates are made of layers of infra-red transparent, low loss materials having different indices of reflection. The layers should be one quarter wavelength in thickness (in the dielectric) at the frequency to which the resonator is "tuned." Various combinations of dielectric materials may be employed. For example, the high index of refraction material may be Teflon and the low index of refraction material a vacuum or a suitable gas. At the very near end of the infra-red spectrum, the high index of refraction material may be solid germanium or solid silicon and the low index of refraction material a porous form of germanium or silicon.

The resonator works similarly to a so-called "etalon" in the visible light region. Infra-red waves between the two plates are partially passed through the plates and partially reflected from the different plate layers. The result is a standing wave pattern set up between the plates and an infra-red wave coherent signal output through one of the plates. Means, similar to the ones shown in Figure 3, may be provided for tuning or frequency modulating the wave output of the resonators shown in Figures 3 and 4.

Figure 11 illustrates an infra-red wave amplifier circuit. Only the resonator portion of the structures of Figures 3 and 4 is illustrated. Plates 100 and 102 may be similar to the ones shown in Figure 9 or 10. The infra-red wave to be amplified is passed through the upper, semi-transparent plate 100. It may be directed at plate 100 from a reflecting surface or it may be coupled to plate 100 through a hollow pipe several inches in diameter filled with an infra-red wave transparent gas such as dry nitrogen. The two plates are spaced apart an integral number of half wavelengths at the frequency of the infra-red wave to be amplified. The spacing may be on the order of several hundred wavelengths or more. A portion of the amplified wave passes through output plate 102 to member 104 which is formed with a focusing infra-red ray reflecting surface 106. The surface may comprise a thin, smooth layer of silver or copper or the like. The surface focuses the infra-red waves onto a detector 108 which detects any modulation present on the wave and passes it to amplifier 110. At the near end of the spectrum, the detector may comprise a photoconductive cell such as a lead sulfide cell. At the far end of the spectrum a thermal detector such as a bolometer, thermocouple or the like may be used.

Figure 12 shows, in schematic form, how the infra-red generating and amplifying apparatus may be incorporated in the head end of a superheterodyne receiver. Amplifier 120 includes a pair of plates 122, 124 which partially reflect and are partially permeable to infra-red waves. The amplifier also includes the gas focusing structure shown in detail in Figures 3 and 4, or the modified focusing structure shown in Figure 5; however, only the resonator is shown in Figure 12. Oscillator 126 is similar to amplifier 120 except that one of the resonator plates 128 reflects infra-red waves but is not permeable to infra-red waves. Resonator plate 130 partially reflects and is partially permeable to infra-red waves. Plates 122, 124 and 130 may be similar to those shown in Figure 9 or those shown in Figure 10. The mirror 132 may consist of an infra-red wave transparent plate 134 having a very thin, optically finished reflecting surface 136 like the one of Figure 9 and formed with a plurality of holes therein like the ones of Figure 9. A portion of the waves from oscillator 126 are reflected from surface 136 to reflector 142. A portion of the waves from amplifier 120 pass through the holes to reflector 142.

In an alternative form of the invention, mirror 132 may comprise a quartz or the like plate having a layer of silver, copper or the like which is sufficiently thin to be partially transparent to and partially reflective of the infra-red waves incident thereon.

In operation, an infra-red wave to be amplified is coupled to the cavity resonator 122, 124 of amplifier 120. Standing waves are set up between the plates and amplified, and output infra-red waves pass through plate 124 and partially pass through mirror 132. The cavity resonator 128, 130 of oscillator 126 produces infra-red waves at a frequency slightly displaced from that of the input signal. These pass through partially permeable member 130 and are partially reflected from the surface 136 of mirror 132. The amplified and generated waves pass from mirror 132 to the highly polished surface 140 of infra-red wave reflector 142. Surface 140 focuses the waves onto a detector element 144 like the one of Figure 11. The generated and amplified waves are mixed in detector 144 and a difference intermediate frequency signal is available at leads 146.

In the system of Figure 12, some power is lost. A portion of the signal from amplifier 120 is reflected from the mirror rather than passing through it. Similarly, a portion of the signal from oscillator 126 passes through the mirror rather than being reflected from it. This lost power may be recaptured by placing another reflector and detector like 142 and 144, respectively, above the mirror (as viewed in the drawing). The output intermediate frequency signal of this other detector unit could be added in phase with that of the detector 144 by connecting the two in parallel through the proper lengths of leads.

An alternative to the system of Figure 12 is shown in Figure 21. Only the resonator portions of amplifier 235 and oscillator 236 are shown. The remainder of the oscillator and amplifier may be as shown in Figures 3 and 4. The principal difference between the plates of the resonators of Figures 12 and 21 is that the latter are spherically or parabolically shaped. Plates 238, 239 and 240 are partially permeable to and partially reflect infra-red waves. These plates may be similar to those of Figure 9 or 10, depending on the infra-red frequency of interest. Plate 242 reflects infra-red waves. The pairs of plates are parallel to and are spaced an integral number of half wavelengths apart.

The system works similarly to the one of Figure 12. However, as plates 239 and 240 are curved, they focus the waves passing through the plates. Detector 244, which may be similar to the detector of Figure 12, is placed at the common focus of plates 239 and 240. The partially reflecting mirror 132 is not necessary.

Figures 13 and 14 illustrate a form of this invention suitable for the generation of relatively high amounts of power at frequencies characteristic of resonant gas transitions. A plurality of annular apertures are employed for supplying gas rather than the single one shown in Figures 3 and 4. The cut away view of Figure 13 shows two such continuous apertures 150, 152. However, 5, 10 or even a hundred or more may be used if desired. The amplifying system is in the form of a long cylinder having a gas-tight outer wall 154, an inner wall 156. Between the two walls is an annular space 158 through which the resonant gas enters the system. The means for circulating the gas may include a diffusion pump and conduits similar to the ones shown in Figure 3. Inner wall 156 is formed with a plurality of annular apertures, each provided with corrugated sheets and spacer plates as in the arrangement of Figure 3. If desired, the plates may be replaced with tubes such as shown in Figure 6. The gas focusing system consists of concentric rings 56, 58 charged to the same potential, and annular plates 80 and 82 charged to another potential. There is a large difference in potential between the rings and plates. This arrangement is analogous to the one shown in Figure 5. Alternatively, the focusing system shown in Figure 3 may be employed instead. The wave transmission means for the system comprises an elongated, transversely slotted cylinder 160 which may be left open at both ends. There is one slot for each focusing system. The slots are almost continuous, a small portion 162 of the wave transmission means being left intact for purposes of mechanical support. A refrigerating coil 164 is wound around the wave transmission means for cooling purposes. The coil is so arranged so it does not block the slots. This is indicated by the dashed line. Liquid nitrogen or a similar refrigerant may be passed through the coils. Should a layer of frozen ammonia of sufficient thickness to impair the operation of the system build up on or in the cylinder 160, it may periodically be removed by passing a hot liquid through the coil and then evacuating the excess ammonia.

In operation, when acting as an amplifier, the electromagnetic wave to be amplified is passed through wave transmission means 160. The wave, if a microwave, is in a mode such that the circumferential slots do not interfere with wave propagation. The wave may be an infra-red wave. The resonant gas such as ammonia is passed into space 158 and through apertures 150, 152, etc. The molecules in the gas in the upper inversion states are focused by the focusing system and passed through the transverse slots in the wave transmission means. Cylindrical members 166 are formed with mirrored outer surfaces and serve to reflect any heat which may be radiated from wall 156 back to the wall. The heating means may comprise heater coils, steam conduits or the like, in the aperture walls, as explained in connection with Figures 3 and 4. These are not shown in Figure 13.

As in the embodiment of Figures 3 and 4, the amplifier may be tuned by employing either the Zeeman or Stark effects. In the form of the invention shown in Figures 13 and 14, tuning via the Zeeman effect is illustrated. The tuning means comprises a coil 159 of insulated wire wound around the amplifier for producing a magnetic field. Current from a source (not shown) may be passed through the coil for tuning (direct current) or frequency modulating (alternating current) the output wave.

The form of the invention shown in Figures 13 and 14 is capable of amplifying or generating and it is applicable to the infra-red as well as the microwave region of the spectrum. In all cases, it is necessary that the wave transmission means dimensions be such that wave energy at the desired output frequency will propagate. It is also necessary that there be sufficient power generated to overcome losses in the system.

When acting as an amplifier, the wave transmission means may be a long tube open at both ends. The gain of the tube is made sufficiently low (no feedback) so that noise or similar impulses are not amplified in a non-linear manner. A coherent signal at a molecular transition frequency (in the infra-red or microwave frequency region) which the wave transmission means is capable of propagating is amplified. Such a signal may be applied to one open end of the wave transmission means and an output, amplified signal taken from the other open end of the wave transmission means.

Figure 15 illustrates a form that the wave transmission means 160 may take when the system is used as a coherent generator of infra-red waves. One end of the wave transmission means is closed by an infra-red wave reflecting member 170. This member may, for example, be one with a highly polished surface 172 as already described. The other end of the wave transmission means is closed by a member 174 which partially reflects and is partially permeable to infra-red waves. The spacing between plates 172 and 174 is an integral number of half wavelengths at the desired infra-red transition frequency of the ammonia gas. The device, in effect, is a long etalon. Standing waves are set up in the direction indicated by arrows 176 and an output passes through member 174.

Plate 170 may be replaced with one like plate 174. In this form of the invention, the system may be used either as an amplifier or generator. The amount of internal regenerative feedback is one of the factors which determines whether the system will break into oscillation. This in turn depends in part on system losses and the amounts of reflection from members 170 and 174.

The same technique as described above in connection with Figure 15 may be employed to generate or amplify microwaves. In this case member 170 may be a highly conductive metal such as silver or copper. Member 174 may be formed of the same material. One or both members may be provided with an output aperture (like the ones shown in Figure 3) to which a waveguide may be coupled. Other equally well known output means are possible. The mode of the generated or amplified microwave, within the slotted waveguide, is in the $TE_{on}$ waveguide mode.

Another form of wave transmission means which may be substituted for the one of Figure 13 is shown in Figure 16. Here, one end of the transversely slotted cylinder is a resonator 200, and the remainder of the cylinder acts as an amplifier 202. As in the embodiment of Figure 15, the amplifier and resonator dimensions and the material of which members 204 and 206 are formed depend upon the frequency of the system.

In operation, oscillations which start in the resonator 200, quickly build up standing waves within the resonator. A portion of the energy passes through partially permeable plate 204 and into the amplifier section 202. The latter is many times the length of the resonator and the resonant gas in the amplifier amplifies the generated wave.

The power output of a coherent infra-red oscillator such as described in connection with Figures 9 and 10 corresponds roughly to the portion of the power output of a black body at very high temperature (at least $10^{11}$° Kelvin), at a frequency corresponding to a gas inversion frequency. The total power radiated at this selected frequency is relatively small, on the order of $10^{-8}$ watts. Powers on this order of magnitude are suitable for the operation of the mixer or the tuned radio frequency stage of a superheterodyne receiver. With the system of Figures 13–16, however, sufficient power may be generated for certain transmitter applications.

The system of Figures 13–16 is also suitable for pulsed operation at even higher power levels—on the order of $10^6$ watts. In the explanation which follows, the operation of an infra-red, pulsed generator will be discussed. The explanation is equally applicable to the generation of high-power microwave pulses.

In the continuous wave operation of an infra-red wave oscillator, the ammonia (or equivalent) gas is caused to emit radiation as soon as it gets into the region of the stimulating radiation (that is, as soon as it reaches the cavity resonator or other wave transmission means). When the upper inversion state molecules are heavily concentrated, the radiation from the gas occurs before the gas has traveled far into this region. As a result, a good portion of the gas in the active region (the region within the wave transmission means) has already spent its energy.

It has been found that if the oscillator is made to lie quiescent for a time sufficiently long substantially to fill the active region with molecules of the gas in the upper of the inversion states, all of the energy "stored" in the gas can be released in the form of a short pulse. This type of operation can be described as the "spontaneous generation of an electromagnetic shock wave." The resulting electromagnetic pulse emitted is very intense and very short. This effect is strongly non-linear and is analogous to the conversion of a strong sound wave into a shock wave.

A system of the type described above is illustrated in block diagram form in Figure 17. Infra-red wave generator 180 is the one shown in more detail in Figures 13, 14 and 15. The gas within the elongated wave transmission means 160 (Figure 13) is prevented from "prefiring" (giving up its stored energy) by any one of a number of different methods. In the system of Figure 17, the gas is maintained detuned to prevent pre-firing. This is done by applying a relatively long and strong pulse at a microwave frequency to the wave transmission means. The pulse may be generated by a microwave source 182 such as a magnetron and may be applied to the wave transmission means via a waveguide, coaxial line or the like, illustrated by a single lead 184. Pulser 186 may be any suitable type of pulser known in the art. The frequency output of source 182 is not equal to any transition frequency of the molecularly resonant gas in generator 180. The microwave pulse is passed through the long columns of gas starting at the input end. The abrupt termination of the pulse prepares the gas for the quasi-spontaneous breakdown of the gas with the generation of an electromagnetic shock wave. This breakdown may be enhanced by passing through the column, immediately after the termination of microwave pulse, a pulse of infra-red waves. The means for doing this may comprise a reflector 188 and infra-red wave source 190. The source is turned on by a pulse 192 from pulser 186. The pulse waveforms are shown in Figure 17. Pulse 192 is shown beginning slightly before the end of the magnetron pulse. This does no harm as, during the period both pulses are applied, the system is detuned. On the other hand, it is advantageous to start pulse 192 somewhat early, to compensate for time delays in the system.

The form of wave transmission means shown in Figure 16 may also be used in the high power pulse system of Figure 17. In this form of the invention, the resonator 200 is maintained detuned by passing through the resonator a high power microwave pulse, or by producing a static electric field between the elements 204 and 206. (The latter, if metal, may be insulated from the cylinder walls to permit this.) The remainder of the wave transmission means, amplifier 202, has a gain which is normally insufficient to cause the amplifier to amplify to relatively high levels any noise impulses which may be at the resonant gas transition frequency of interest. When the microwave pulse is stopped, or when the electrostatic field is terminated suddenly, oscillations rapidly build up within resonator 200. These pass through partially permeable member 204 and start the electromagnetic shock wave in amplifier 202. The forms of the invention shown in Figures 16 and 17 are applicable to the generation of waves in both the microwave and infrared region of the spectrum.

Figures 18 and 19 illustrate, in schematic form, another way of maintaining the hollow-cylinder, wave transmission means detuned. As is shown in Fig. 18, the cylinder consists of two semi-cylindrical parts 210, 212 which are insulated from one another by dielectric spacers 214. The cylinder has transverse slots (not shown) spaced along its length through which the resonant gas is admitted as in the other embodiments. In the form of the invention used for the generation of a shock wave at a microwave frequency, spacers 214 may be three-quarters of a wavelength long at the frequency of interest, whereby the space between the two semi-cylindrical members at the inner wall of the cylinder appears as a short circuit. Pulser 216 applies a direct voltage pulse across cylinder sections 210, 212 of sufficient amplitude to maintain the gas within the cylinder detuned.

In Figure 19, the two cylinder sections 210, 212 are illustrated schematically as the two conductors of a transmission line. The pulser 216 is connected to one end of the transmission line. In order to prevent reflections, the transmission line is terminated at its far end in its characteristic impedance $R_C$.

Another way of preventing the system from pre-firing is to use a hollow wave transmission means, open at both ends, which has insufficient gain to amplify, in a non-linear fashion, noise or similar spontaneous pulses. When sufficient high energy state gas has accumulated in the tube, the gas is fired by passing through it a high power pulse having a frequency component at the desired transition frequency.

The way in which the electromagnetic shock wave is excited may be explained somewhat in the following manner. The initial wave has its origin in infra-red wave source 190 (Figure 17). Alternatively, the infra-red wave source may be omitted in which case the initial wave may be started by noise or spontaneous radiation in the gas. As the initial wave (which is at the transition frequency to which the column of gas in the generator is tuned) passes down the wave transmission means, it becomes amplified until it is so strong that saturation begins to take place. The amplification process now becomes non-linear with the onset of the wave becoming sharper and more intense. For a sufficiently long wave transmission means, the output pulse has a length of only a few cycles of the infra-red frequency (for example, $10^{-12}$ seconds).

A communications system in which the continuous wave generators and amplifiers of infra-red waves described above may be employed is illustrated schematically in Figure 20. Block 220 comprises one or more coherent generators and amplifiers of infra-red waves and means for modulating signals onto the infra-red waves. The system of this block may comprise one or more devices such as shown in Figure 13. The transmission line for infra-red waves comprises a hollow pipe filled with an infra-red wave transparent gas. The pipe diameter may be as small as five inches or less, however, the greater the pipe diameter the greater the distance the wave may be transmitted before requiring a booster or repeater station. Pipe diameters on the order of twenty inches or more are feasible and desirable. The pipe may be formed of a conducting material or an insulating material. The inner walls of the pipe may be reflecting but preferably should be coated with a material which adsorbs infra-red radiation. The gas filling the pipe may be dry nitrogen at a pressure somewhat greater than atmospheric pressure so that if there are leaks in the pipe, the gas will slowly escape. The reason the gas is under pressure is to prevent oxygen, water vapor or other infra-red wave attenuating gases from entering the pipe. The waves may be launched into the pipe by means of a lens system, a reflector, or simply by aligning the output end of the system of Figure 13 with the input end of the hollow pipe.

If the distance is sufficiently great, it may be desirable to include in the transmission means one or more booster stations 224 which are simply amplifiers of infra-red waves as previously described. The output of the booster station is applied through a second pipe 222a to the coherent amplifier of infra-red waves, detectors, and utilization circuits, all shown as a single block 226.

What is claimed is:

1. Means for concentrating the molecules of a gas comprising a member formed with an endless aperture through which the gas is adapted to flow, said aperture facing a common center region, and means producing an inhomogeneous electric field for focusing the gas emitted from said aperture through said center region.

2. Means for concentrating the molecules of a gas comprising a member formed with a continuous annular aperture through which the gas is adapted to flow, said aperture facing a common center region, means in the aperture for selectively passing molecules of the gas having a velocity component which is principally in the direction of said center region; and means for focusing the gas emitted from said aperture through said center region.

3. Means for concentrating the molecules of a gas comprising a member formed with a continuous annular aperture through which the gas is adapted to flow, said aperture facing a common center region in the plane of said aperture; means in said aperture defining a plurality of channels substantially filling said aperture and having axial dimensions at least ten times their cross-sectional dimensions, said axial dimensions all extending toward said center region; and means for focusing the gas emitted from said aperture through said center region.

4. Means for concentrating the molecules which are in the upper of two coupled energy states of an electromagnetic wave resonant gas subject to an ammonia type Stark effect comprising a member formed with an endless aperture through which the gas is adapted to flow, said aperture facing a common center region in the plane of said aperture; means in the aperture for selectively passing only those molecules of the gas having a velocity component which is principally in the direction of said center region; and means for producing an inhomogeneous electric field which has a relatively low value in said plane in the region between said aperture and said center region and which sharply increases, with distance, to a relatively high value in directions away from said plane in the region between said aperture and said center region.

5. A plurality of means as set forth in claim 4 spaced from one another and arranged concentric with a common axis.

6. Means for concentrating the molecules which are in the upper of two coupled energy states of an electromagnetic wave resonant gas subject to an ammonia type Stark effect comprising, a member formed with a substantially continuous, annular aperture through which the gas is adapted to flow, said aperture facing a common center region in the plane of said aperture; means in said aperture defining a plurality of channels substantially filling said aperture and having axial dimensions at least ten times their cross-sectional dimensions, said axial dimensions all extending toward said center region; first means for producing an intense electrostatic field, said means being arranged parallel to said plane on one side thereof and extending from a region adjacent one entire edge of said aperture toward said center region; and second means for producing an intense electrostatic field, said second means being arranged parallel to said plane on the other side thereof and extending from a region adjacent the other entire edge of said aperture toward said center region.

7. A member formed with a substantially continuous, annular aperture through which ammonia gas at reduced pressure and in thermal equilibrium is adapted to flow, said aperture facing a common center region in the plane of said aperture; means in said aperture defining a plurality of channels substantially filling said aperture and having axial dimensions at least ten times their cross-sectional dimensions, said axial dimensions all extending toward said center region; first means for producing an intense electrosatic field, said means being arranged parallel to said plane on one side thereof and extending from a region adjacent one entire edge of said aperture toward said center region; second means for producing an intense electrostatic field, said second means being arranged parallel to said plane on the other side thereof and extending from a region adjacent the other entire edge of said aperture toward said center region, said first and second means serving to collimate the gas molecules in upper inversion energy states and to defocus the gas molecules in lower inversion energy states; and means for effectively removing the defocused molecules of said gas.

8. Means for concentrating the molecules which are in the upper of two coupled energy states of an electromagnetic wave resonant gas subject to an ammonia type Stark effect comprising, a member formed with a substantially continuous, annular aperture through which the gas is adapted to flow, said aperture facing a common center region in the plane of said aperture; means in the aperture for selectively passing molecules of the gas having a velocity component which is principally in the direction of said center region; first means for producing an intense electrostatic field said means being arranged parallel to said plane on one side thereof and extending from a region adjacent one edge of said aperture toward said center region; and second means for producing an intense electrostatic field, said second means being arranged parallel to said plane on the other side thereof and extending from a region adjacent the other edge of said aperture toward said center region, said first and second means each comprising a plurality of concentrically arranged, ring shaped wires of successively decreasing diameters concentric with said center region, alternate wires being adapted to be maintained at the same potential, and adjacent wires being adapted to be maintained at differences of potential of at least 10,000 volts.

9. Means for concentrating the molecules which are in the upper of two coupled energy states of an electromagnetic wave resonant gas subject to an ammonia type Stark effect comprising, a member formed with a substantially continuous, annular aperture through which the gas is adapted to flow, said aperture facing a common center region in the plane of said aperture; means in said aperture defining a plurality of channels substantially filling said aperture and having axial dimensions at least ten times their cross-sectional dimensions, said axial dimensions all extending toward said center region; a first plurality of concentrically arranged, spaced, conductive rings of successively smaller diameters lying in a plane parallel to and on one side of the plane of said aperture and extending from a region adjacent one edge of said aperture toward said center region; a second plurality of concentrically arranged, spaced, conductive rings of successively smaller diameters lying in a plane parallel to and on the other side of the plate of said aperture and extending from a region adjacent the other edge of said aperture toward said center region; and means operatively associated with said first and second rings for producing an intense electrostatic field immediately adjacent said rings.

10. A plurality of means as set forth in claim 9 spaced from one another and arranged concentric with a common axis.

11. The invention as set forth in claim 9, wherein said last-named means comprises means for maintaining all of said rings at a common reference potential, two annular plates arranged parallel to said plane and on sides of said rings away from said plane, and means electrically coupled to said plates for maintaining them at high direct potentials, relative to said reference potential.

12. Apparatus, including an electromagnetic wave transmission means, for coherently generating infra-red waves.

13. Apparatus, including an electromagnetic wave resonator, for coherently generating infra-red waves.

14. A resonator for infra-red waves at a given frequency comprising a pair of parallel plates which are highly reflective of infra-red waves at said frequency, said plates being spaced apart an integral number of half wavelengths at said frequency, at least one of said plates being formed with holes over the major portion of its extent, said holes extending through said plate, said holes being spaced from one another less than a wavelength at said frequency and arranged in a pattern such that infra-red waves which pass through said holes reinforce one another.

15. A resonator as set forth in claim 14, wherein said plates are flat.

16. A resonator as set forth in claim 14, wherein said plates are curved.

17. A resonator for infra-red waves at a given frequency comprising a pair of parallel, infra-red wave transparent members facing one another, and being at least several hundred wavelengths, at said frequency, from side-to-side; a coating of infra-red wave reflecting material on the parallel surfaces of said members, respectively, said coating being a small fraction of a wavelength in thickness, at said frequency, the coating on at least one of said members being formed with holes, a fraction of a wavelength in diameter, at said frequency, spaced in a geometric pattern, and less than a wavelength from one another, at said frequency, said two coatings being spaced an integral number of electrical half wavelengths apart, at said frequency.

18. In combination, a closed, evacuated, gas-tight, hollow, internally cylindrical container formed with a substantially continuous annnular aperture in the inner, circumferential wall thereof; means for passing ammonia gas at reduced pressure through said aperture and into said container; means for heating or cooling said gas at said aperture; means in the aperture for selectively passing only those molecules of the gas having a velocity component which is principally in the direction of the center region of said container; means for focusing the molecules in the upper inversion states of said gas into a stream directed from the entire extent of said annular aperture toward the center region of said container; a hollow wave transmission means surrounding said center region and formed with an opening through which said stream of gas flows, said hollow wave transmission means being dimensioned to propogate an electromagnetic wave at a frequency characteristic of a molecular transition in said gas; and wave transmission means electrically coupled to said hollow wave transmission means and extending outside of said container.

19. In combination, a closed, evacuated, gas-tight, hollow, internally cylindrical container formed with a substantially continuous annular aperture in the inner, circumferential wall thereof; means for passing ammonia gas in thermal equilibrium at reduced pressure through said aperture and into said container; means in the aperture for selectively passing only those molecules of the gas having a velocity component which is principally in the direction of the center region of said container; means for focusing the molecules in the upper inversion states of said gas into a stream directed from the entire extent of said annular aperture toward the center region of said container; a hollow wave transmission means surrounding said center region and formed with an opening through which said stream of gas flows, said hollow wave transmission means being dimensioned to propagate an electromagnetic wave at a frequency characteristic of a molecular transition of said gas; means for applying an electric field through said hollow wave transmission means; and wave transmission means electrically coupled to said hollow transmission means and extending outside of said container.

20. In the combination as set forth in claim 19, said hollow wave transmission means comprising an electromagnetic wave resonator.

21. In the combination as set forth in claim 19, said hollow wave transmission means comprising a resonator tuned to an infra-red frequency characteristic of a rotational transition between molecules of the ammonia gas.

22. In the combination as set forth in claim 19, said hollow wave transmission means comprising a circularly cylindrically hollow cavity resonator adapted to resonate in the $TE_{01}$ mode at a frequency characteristic of an inversion transition between molecules of the ammonia gas, said cavity resonator being formed with a substantially continuous circular aperture concentric with the axis of said cavity resonator and located in the center region of the circumferential wall thereof, said last-named aperture lying in the same plane as the aperture in the inner circumferential wall of the closed container.

23. The invention as set forth in claim 19, the means in said aperture for selectively passing molecules of the gas having a velocity component which is principally in the direction of the center region of said container comprising a plurality of hollow tubes substantially filling the aperture having circular openings less than 10 mils in diameter and lengths at least ten times said diameters, the axes of said tubes all extending toward the center region of said container.

24. The invention as set forth in claim 19, said means in the aperture for selectively passing the molecules of the gas having a velocity component which is principally in the direction of the center region of said container comprising a plurality of annular, spacer plates arranged parallel to one another and concentric with the axis of said container, and a plurality of annular, corrugated members located between the spacer plates and arranged concentric with the axis of said container, the axes of the corrugations extending toward the axis of said container.

25. In combination, an elongated, hollow wave transmission means dimensioned to support the propagation of electromagnetic waves at a frequency characteristic of a molecular transition between two coupled energy states of an electromagnetic wave resonant gas, said means being formed with spaced apertures along its length; and means for producing a like plurality of spaced, collimated streams of said resonant gas having molecular populations which are greater in the upper than in the lower of said two coupled energy states and for directing said streams into different ones of said apertures.

26. In combination, a circular, elongated, hollow waveguide dimensioned to support the propagation of electromagnetic waves at a frequency charcteristic of a molecular transition in ammonia gas, said means being formed with spaced transverse slots along its length; and means for producing a plurality of spaced, collimated streams of ammonia gas having molecular populations predominately in the upper inversion states and for directing said streams into different ones of said apertures.

27. In combination, a closed, evacuated container having a longitudinal axis; a plurality of means spaced from one another in the direction of said axis for admitting streams of electromagnetic wave resonant gas at reduced pressure into said container; an elongated wave transmission means dimensioned to support the propagation of electromagnetic waves at a frequency characteristic of a molecular transition in said gas arranged concentric with said longitudinal axis, and formed with spaced transverse slots along its length; and means for collimating said resonant gas into streams having molecular populations which are greater in the upper than in the lower of two coupled energy states and for directing said streams into different ones of said apertures.

28. In combination as set forth in claim 27, said container having an inner circular wall concentric with said axis, and said means for admitting gas comprising annular apertures formed in said circular wall concentric with said longitudinal axis and spaced from one another in the direction of said axis.

29. In the combination as set forth in claim 28, said gas comprising ammonia, and said wave transmission means comprising an elongated resonator dimensioned to a frequency characteristic of a rotational transition of the molecules of said gas.

30. In the combination as set forth in claim 27, further including means coupled to said wave transmission means for tuning said gas.

31. In the combination as set forth in claim 27, further including means coupled to said wave transmission means for frequency modulating the electromagnetic waves transmitted thereby.

32. In the combination as set forth in claim 27, further including means operatively associated with said wave transmission means for producing a magnetic field for tuning said gas.

33. A method for producing an eelctromagnetic shock wave comprising the steps of admitting to a wave transmission means dimensioned to propagate a wave at a frequency characteristic of a molecular transition in ammonia, molecules of ammonia gas having energy populations predominately in the upper inversion energy states; detuning said gas during the introduction of said gas in order to prevent the energy stored in said gas from being released in the form of an electromagnetic wave at said frequency; then, after a relatively large quantity of gas molecules having energy populations in the upper inversion states of the gas have accumulated in the wave transmission means, retuning the gas to said frequency.

34. A method for producing an electromagnetic shock wave in the microwave frequency band comprising the steps of admitting to a wave transmission means dimensioned to propagate a wave at a frequency characteristic of the transition of ammonia gas molecules from the upper to the lower of a pair of inversion energy states, ammonia gas substantially more of whose molecules are in said upper than in said lower energy state; detuning said gas during the introduction of said gas in order to prevent the energy stored in said gas from being released in the form of an electromagnetic wave at said frequency; after a relatively large quantity of gas molecules having energy populations in said upper inversion state have accumulated in the wave transmission means, retuning the gas to said frequency; and, simultaneous with the retuning of said gas, radiating a pulse having a frequency component at said frequency through said wave transmission means.

35. A method for producing an infra-red electromagnetic shock wave comprising the steps of admitting to a wave transmission means dimensioned to propagate a wave at an infra-red frequency characteristic of the rotational transition of ammonia gas between two coupled energy states of the gas; ammonia gas more of whose molecules are in the upper than in the lower of said states; detuning said gas during the introduction of said gas in order to prevent the energy stored in said gas from being released in the form of an electromagnetic wave at said infra-red frequency; after a relatively large quantity of gas molecules having energy populations in said upper inversion state have accumulated in the wave transmission means, retuning the gas to said infra-red frequency; and, simultaneous with the retuning of said gas, radiating a pulse having a frequency component at said infra-red frequency through said wave transmission means.

36. A method for producing an electromagnetic shock wave comprising the steps of admitting to a wave transmission means dimensioned to propagate a wave at a frequency characteristic of the molecular transition between the molecules of two coupled energy states of an electromagnetic wave resonant gas, molecules of the gas substantially more of which are in the upper than in the lower of said two coupled energy states; effectively detuning the gas relative to the wave transmission means during the introduction of said gas in order to prevent the energy stored in said gas from being released in the form of an electromagnetic wave at said frequency; then, after a relatively large quantity of gas molecules in said upper energy state have accumulated in said wave transmission means, retuning the gas to said wave transmission means.

37. A method for producing an electromagnetic shock wave comprising the steps of admitting to an elongated waveguide dimensioned to propagate a wave at a frequency characteristic of the molecular transition between the molecules of two coupled energy states of an electromagnetic wave resonant gas, molecules of the gas substantially more of which are in the upper than in the lower of said two coupled energy states; passing a radio wave having a frequency unrelated to the molecular transition down the waveguide for detuning said gas relative to the wave transmission means during the introduction of said gas in order to prevent the energy stored in said gas from being released in the form of an electromagnetic wave at said frequency; after a relatively large quantity of gas molecules in said upper energy state have accumulated in said wave transmission means, retuning the gas to said wave transmission means by removing the radio wave excitation from the waveguide; and, simultaneous with the removal of the radio wave excitation, passing a relatively short burst of electromagnetic waves having a frequency component at a frequency characteristic of said transition down said waveguide.

38. A method for producing an electromagnetic shock wave comprising the steps of admitting to a wave transmission means dimensioned to propagate a wave at a frequency characteristic of the molecular transition between the molecules of two coupled energy states of a molecularly resonant gas, molecules of the gas more of which are in the upper than in the lower of said two coupled energy states; passing energy at a microwave frequency unrelated to said frequency characteristic of a molecular transition through said wave transmission means during the introduction of said gas for detuning said gas in order to prevent the energy stored in said gas from being released in the form of an electromagnetic wave at said frequency; then, after a relatively large quantity of gas molecules in said upper energy state have accumulated in said wave transmission means, retuning the gas to said wave transmission means.

39. In combination, a closed, evacuated, hollow container; an electromagnetic wave resonator within said container tuned to an infra-red frequency characteristic of a rotational transition between the molecules of two coupled energy states of ammonia gas; and means for passing through said resonator molecules of said gas at reduced pressure substantially more of which are in the upper than in the lower of said two coupled energy states.

40. In combination, a wave transmission means dimensioned to propagate a wave at a frequency characteristic of a molecular transition between the molecules of two coupled energy states of an electromagnetic wave resonant gas; means for introducing an electromagnetic wave resonant gas having more molecules in the upper than in the lower of said two coupled energy states into said wave transmission means; means operatively coupled to said wave transmission means for preventing the molecules of said gas from releasing energy in the form of an electromagnetic wave at said frequency; and means for periodically effectively decoupling said last-named means from said wave transmission means for periods which are small fractions of the periods during which the gas is prevented from releasing energy.

41. In combination, a wave transmission means dimensioned to propagate a wave at a frequency characteristic of a molecular transition between the molecules of two coupled energy states of an electromagnetic wave resonant gas; means for introducing a resonant gas having more molecules in the upper than in the lower of said two coupled energy states into said wave transmission means; detuning means operatively coupled to said wave transmission means for preventing the molecules of said gas from releasing energy in the form of electromagnetic waves at said frequency; and means for periodically effectively decoupling said detuning means from said wave transmission means for periods which are small fractions of the detuning periods.

42. In combination, a closed, evacuated, hollow container; an electromagnetic wave resonator within said container tuned to an infra-red frequency characteristic of a molecular transition between the molecules of two coupled energy states of an electromagnetic wave resonant gas; and means for passing through said resonator molecules of said resonant gas more of which are in the upper than in the lower of said two coupled energy states.

43. In the combination as set forth in claim 42, said resonator comprising two flat plates spaced an integral number of half wave lengths apart at said infra-red frequency, at least one of said plates being partially permeable to and partially reflective of infra-red waves at said frequency, and the other of said plates being at least reflective of infra-red waves at said frequency.

44. In the combination as set forth in claim 42, said gas comprising ammonia gas at reduced pressure.

45. An electromagnetic wave resonator tuned to an infra-red frequency characteristic of a molecular transition between the molecules of two coupled states of an electromagnetic wave resonant gas; and means for passing a resonant gas into said resonator having more molecules in the upper than in the lower of said two coupled energy states.

46. The invention as set forth in claim 45, in which said gas is ammonia.

47. A transmission means for infra-red waves comprising a hollow pipe filled with an infra-red wave transparent gas at a pressure somewhat higher than the pressure of the gas surrounding said pipe.

48. Apparatus, including an electromagnetic wave transmission means and an electromagnetic wave resonant substance within said wave transmission means which is capable of a molecular transition at an infra-red frequency, for coherently amplifying infra-red waves.

49. Apparatus, including an electromagnetic wave resonator and an electromagnetic wave resonant substance in said resonator which is capable of a molecular transition at an infra-red frequency, for coherently amplifying infra-red waves.

50. In combination, a closed, evacuated, gas-tight, hollow, internally cylindrical container formed with a substantially continuous annular aperature in the inner, circumferential wall thereof; means for passing an electromagnetic wave resonant gas at reduced pressure through said aperture and into said container; means for focusing the molecules in the upper of two coupled energy states of said gas into a stream directed toward the center region of said container; a hollow wave transmission means surrounding said center region and formed with an opening through which said stream of gas flows, said hollow wave transmission means being dimensioned to propagate an electromagnetic wave at a frequency characteristic of the molecular transition between said two coupled energy states of said gas; and wave transmission means electrically coupled to said hollow wave transmission means and extending outside of said container.

51. In combination, a closed, evacuated, gas-tight, hollow, internally cylindrical container formed with a substantially continuous annular aperture in the inner, circumferential wall thereof; means in the aperture for selectively passing only those molecules of the gas having a velocity component which is principally in the direction of the center region of said container; means for passing an electromagnetic wave resonant gas at reduced pressure through said aperture and into said container; means for focusing the molecules in the upper of two coupled energy states of said gas into a stream directed from the entire extent of said annular aperture toward the center region of said container; a hollow wave transmission means surrounding said center region and formed with an opening through which said stream of gas flows, said hollow wave transmission means being dimensioned to propagate an electromagnetic wave at a frequency characteristic of the molecular transition between said two coupled energy states of said gas; and wave transmission means electrically coupled to said hollow wave transmission means and extending outside of said container.

52. In combination, a closed, evacuated, gas-tight, hollow, internally cylindrical container formed with a substantially continuous annular aperture in the inner, circumferential wall thereof; means for passing ammonia gas at reduced pressure through said aperture and into said container; means in said aperture defining a plurality of channels substantially filling said aperture and having axial dimensions at least ten times their cross-sectional dimensions, said axial dimensions all extending toward the center region of said container; means for focusing the molecules in the upper inversion states of said gas into a stream directed from the entire extent of said annular aperture toward the center region of said container; a hollow wave transmission means surrounding said center region and formed with an opening through which said stream of gas flows, said hollow wave transmission means being dimensioned to propagate an electromagnetic wave at a frequency characteristic of a molecular transition in said gas; and wave transmission means electrically coupled to said hollow wave transmission means and extending outside of said container.

53. In combination, an elongated, hollow pipe formed with spaced apertures along its length, said pipe being capable of propagating an electromagnetic wave at a frequency characteristic of the transition of molecules of a resonant gas between the upper and lower of a particular pair of coupled energy states, said pipe, when filled with gas which has substantially more molecules in the upper than in the lower of said coupled energy states, having insufficient gain to amplify, in a non-linear fashion, thermal noise signals generated at operating temperatures, and sufficient gain to amplify signals at or near said frequency; and means for passing through said apertures molecules of said resonant gas substantially more of which are in the upper than in the lower of said two coupled energy states.

54. In the combination as set forth in claim 53, further including input means coupled to one end portion of said pipe for applying thereto a coherent signal at said frequency of insufficient amplitude to cause the gas to amplify in a non-linear fashion.

55. In the combination as set forth in claim 53, further including input means coupled to one end portion of said pipe for applying thereto a signal having at least a component at said frequency of sufficient amplitude to cause the gas to amplify in a non-linear fashion.

References Cited in the file of this patent

UNITED STATES PATENTS

| | | |
|---|---|---|
| 2,131,185 | Knoll | Sept. 27, 1938 |
| 2,397,834 | Bowman | Apr. 2, 1946 |
| 2,408,423 | Hartley | Oct. 1, 1946 |